United States Patent [19]

Hofacker

[11] 4,002,458
[45] Jan. 11, 1977

[54] CONTROLLED RELEASE CAPSULES

[75] Inventor: David A. Hofacker, St. Paul, Minn.

[73] Assignee: Minnesota Mining and Manufacturing Company, St. Paul, Minn.

[22] Filed: July 30, 1975

[21] Appl. No.: 600,314

Related U.S. Application Data

[60] Division of Ser. No. 196,807, Nov. 8, 1971, which is a continuation-in-part of Ser. No. 823,164, May 8, 1969, abandoned.

[52] U.S. Cl. .................. 71/27; 71/64 F; 71/65; 71/67
[51] Int. Cl.² ...................... C05G 1/00; C05G 3/02
[58] Field of Search ............. 71/64 F, 65, 67, 3, 71/27, 28, 34, 59, 63, 84, 113, 117, 126; 252/316; 264/4; 424/19, 33, DIG. 7

[56] References Cited

UNITED STATES PATENTS

| 2,770,571 | 11/1956 | Vance et al. ............... 424/37 X |
| 3,079,351 | 2/1963 | Staneslow et al. ............ 117/36.1 X |
| 3,132,074 | 5/1964 | Svedres .................. 117/100 A X |
| 3,423,489 | 1/1969 | Arens et al. ..................... 264/4 |
| 3,778,383 | 12/1973 | Schibler et al. ................ 71/64 F X |
| 3,790,497 | 2/1974 | Sato et al. .................... 71/64 F X |
| 3,943,063 | 3/1976 | Morishita et al. ............. 71/64 F X |

Primary Examiner—Charles N. Hart
Assistant Examiner—Ferris H. Lander
Attorney, Agent, or Firm—Alexander, Sell, Steldt & DeLaHunt

[57] ABSTRACT

The disclosed substantially spherical capsules are particularly adapted for containing a liquid and have permeable or semi-permeable capsule walls. The capsule walls can comprise a first crystalline phase, an amorphous phase which ordinarily is intimately associated with the crystalline phase, and, preferably, a dispersed (discontinuous) second crystalline or semi-crystalline phase such as a wax. These capsules have the ability to release a solute by an effect resembling osmosis and to release a liquid by a transmission and evaporation mechanism.

14 Claims, No Drawings

CONTROLLED RELEASE CAPSULES

This application is a division of copending application Ser. No. 196,807, filed Nov. 8, 1971, which is in turn a continuation-in-part of application Ser. No. 823,164, filed May 8, 1969, now abandoned.

BACKGROUND OF THE INVENTION

This invention relates to a type of controlled release capsules, i.e. capsules with permeable or semi-permeable walls which have the ability to release a solute or a volatile liquid or the like at a predetermined rate. The release of solute is an effect resembling osmosis, while the release of the volatile liquid is an effect produced by partial pressure differences across the capsule walls. An aspect of this invention relates to a process for making the capsules.

There is considerable utility in the art of encapsulation for a means which permits the release of an encapsulated chemical over a predetermined period of time. For example, it is desirable to make one application of agricultural chemicals (fertilizers, pesticides, herbicides, etc.) which is effective for a complete growing season, rather than several successive applications. Also, it is desirable to apply only the necessary amount of fertilizer, thereby preventing ground water pollution.

Various types of coatings (U.S. Pat. No. 3,223,518) and porous packaging films (U.S. Pat. No. 3,059,379) have been suggested for encapsulating solid agricultural chemicals. However, the coatings cannot be utilized to contain aqueous solutions, while the flexible packaging films are not practical for encapsulating liquids. U.S. Pat. No. 2,791,496 discloses the impregnation of exfoliated vermiculite with liquid agricultural chemicals, but this product does not provide a controlled release rate. U.S. Pat. No. 3,423,489 discloses crystalline polyolefin capsules for encapsulating liquids, but these capsules are not suitable for controlled release of the contained liquid.

Accordingly, this invention contemplates providing liquids such as agricultural chemicals in a form which permits release of the chemical over a predetermined period of time. This invention also contemplates a means and method for introducing a controlled amount of microporosity into a membrane which serves as the wall or shell of a capsule.

SUMMARY OF THE INVENTION

This invention provides capsules which have permeable or semi-permeable walls, i.e. walls having microscopic passages or interconnecting pores providing a release route which permits an osmosis-like effect to occur at a controllable or predetermined rate. The observed effect resembles osmosis in that the amount of liquid contained within the capsule walls does not appear to diminish significantly, but any solute dissolved in the encapsulated liquid passes out of the capsules when a moist environment (e.g. soil) containing a lower concentration of solute exists outside the capsules. The capsules also can be used to release liquids volatile at the temperature of use, provided that, a partial pressure driving force is present as in the case when water-containing capsules are placed in a low humidity environment. The capsules are durable, crush resistant, uniformly small, substantially spherical, and non-tacky, and they are particularly suited for providing controlled release of dissolved chemicals from encapsulated aqueous solutions. Among the suitable dissolved chemicals are fertilizers, pesticides, herbicides, and other agents with agricultural utility, but the invention is generally useful for encapsulating liquids or solutions of any desired type. The release rate can be controlled so as to prevent ground water polution in agricultural applications. The filled capsules are dry and can be readily handled and shipped.

It has been found that a microporous capsule wall can be obtained when certain critical phase relationships are observed during the manufacture of the capsules. The capsule shell- or wall-forming material should comprise at least a first material which melts at elevated or moderately elevated temperatures and is capable of forming a single phase when admixed with a second material (which also melts at elevated or moderately elevated temperatures). A small amount of a high-boiling solvent or plasticizing material can be used, if desired, to facilitate this single phase formation step. After the first and second materials have been blended, heated, and formed into a homogeneous molten phase, the wall forming composition is brought into contact with a fill material (preferably an aqueous liquid) by means of the biliquid column technique disclosed in U.S. Pat. Nos. 3,423,489 and 3,389,194, the disclosures of which are incorporated by reference. Contact with the liquid fill rapidly cools the homogeneous wallforming phase, and as this molten phase approaches a solidified state and becomes an incipient capsule wall or shell, one of the materials present in this incipient wall begins to separate out as a discontinuous, solid phase dispersed throughout a substantially continuous wall matrix. The resulting dispersed particles are normally considerably smaller than the thickness of the capsule wall which ultimately results. The dispersed particles preferably contract, upon further cooling, at a rate which is faster than the contraction rate of the continuous matrix, but any disparity between the matrix and dispersed phase with regard to their respective rates or degrees of contraction can assist in the formation of cracks or pores in the capsule walls. Since the dispersed phase is present in a significant quantity, e.g. at least 5 parts by weight of the total composition, the resulting capsule is characterized by microporous walls having a porosity (determined by mercury porosimetry) of at least about 3 volume percent. The "microporosity" (this term being used herein to include submicroscopic porosity) imparts permeability or semipermeability to the capsule walls, and effects similar to osmosis are observed when a concentration gradient across the capsule wall is present. However, these osmosis-like effects are not necessarily limited to the diffusion of solutes; emulsoids and dispersoids also appear to pass through the capsule walls, indicating a variety of transport mechanisms may be operating. It will be understood, in any event, that this invention is not bound by any theory.

The capsules of the present invention are on the order of about 100 to about 10,000 microns, preferably about 1,000 to about 3,000 microns, in diameter. Capsules of this size are readily packaged, stored, and shipped, while larger capsules are weak, fragile, and subject to breakage during packaging, handling, or shipping. Capsules smaller than 100 microns in diameter have a large shell or wall volume in comparison to liquid fill volume and are excessively expensive for most uses. The capsule shell wall thickness varies from about 0.85 to about 10 microns for a 100 micron capsule diameter, from about 35 to about 400 microns for a 4,000 micron capsule diameter, and from about 85 to about 1,000 microns for a 10,000 micron capsule diameter. These capsule shells provide a volume ratio of contained fill to shell sufficiently high for efficient economical use.

The preferred capsules comprise an aqueous fill and a microporous (including sub-microscopic porosity) capsule wall wherein the capsule wall comprises three or more phases, i.e.: a solid, crystalline olefinic polymer phase, an amorphous phase (e.g. a hydrocarbon resin), and a second crystalline or semi-crystalline phase, e.g. a natural, paraffinic or microcrystalline petroleum wax. In this preferred composition, the wax ordinarily separates out first upon cooling, thus forming a crystalline or semi-crystalline phase dispersed throughout a continuous matrix of the other phases. Microporosity results upon further cooling, due apparently to one or more phenomena, including differences in the rate of degree of contraction between two or more phases and shear forces created by the disparity in structure between the different crystal types or between the polyolefin/amorphous resin and wax phases.

DETAILED DESCRIPTION AND EXAMPLES

As pointed out previously, an important factor contributing to the formation of microporous capsule walls involves differences in rates or extent of contraction of materials used to form the capsule wall or shell. A convenient method has been devised for characterizing the extent of the contraction upon cooling the various materials preferred for use in this invention. Briefly summarized, the method comprises filling a test tube or equivalent container to a given measured volume with a sample of the material in a molten state. The molten sample is kept in an oven at a standard temperature, e.g. 230° C. (a typical capsule-forming temperature when the biliquid column technique of U.S. Pat. No. 3,423,489 is used), and permitted to equilibrate, so that the melt is at a uniform temperature. upon equilibration, an excess of sample material, as compared to the original measured volume, will have resulted due to expansion with heat. This excess is removed with a pipet. The oven is then turned off and the sample is allowed to slowly cool to room temperature, e.g. 25° C. The volume at room temperature ($V_{25}$) is measured for comparison with the volume at 230° C. ($V_{230}$). The ratio of $$\frac{V_{230} - V_{25}}{V_{230}}$$

represents a fractional change in volume hereinafter referred to as the "fractional volume contraction" or "V"; 100V is the percentage of change in volume and is hereinafter referred to as the "% volume contraction".

In the preferred embodiments of this invention, the capsule wall-forming material is a blend of crystalline olefinic polymer; an amorphous, thermoplastic organic resin; and a wax. If X represents the weight fraction of polyolefin, Y represents the weight fraction of amorphous resin, and Z represents the weight fraction of wax; and $V_x$ represents the fractional volume contraction (defined previously) of polyolefin, $V_y$ represents the fractional volume contraction of amorphous resin, and $V_z$ represents the fractional volume contraction of the wax, the expression $$\frac{XV_x + YV_y + ZV_z}{XV_x + YV_y}$$

will be greater than one when at least some wax is included in the composition, as is preferred. The expression, of course, approaches 1.0 as the wax concentration approaches zero. Zero wax concentrations result in very low mercury porosimeter readings at the low end of measurable pore size, particularly for the walls of perfect capsules. Grosser pores are sometimes evident in these wax-free capsule walls, but this is a much less preferred type of pore structure. (The solute diffusion rate can be conveniently measured by placing a given weight of capsules in a container with a given volume of water and monitoring the increasing concentration or weight gain of solute in the water, as will be described in detail subsequently.

It will be apparent that the above-noted expression compares the contraction of the total system to the contraction of the polyolefin/amorphous portion of the system. For convenience, this mathematical expression will be hereinafter referred to as the volume contraction ratio, or VCR. Although capsules with a measurable release rate can be obtained when the VCR is 1.0 (see Examples 1 –III, set forth subsequently), significant improvements in reproducibility and controllability of the capsule wall porosity and solute release rate are obtained when the VCR is greater than 1, preferably greater than 1.2. Apparently, a slight microporosity-creating phase separation effect can occur even when there is only one crystalline and one amorphous phase in the wall-forming system. However, at least three phases provide additional, readily controllable microporosity-creating effects. Crystal structure studies indicate that as the three-component melt cools from the temperature of capsule manufacture, the major (preferably continuous) polyolefin/amorphous resin phase comes out of solution last, leaving dispersed zones of a crystalline or semi-crystalline wax. Further loss of heat from the capsule wall or shell causes the polyolefin/amorphous portion and the wax portion to continue to contract. The aforementioned volume contraction ratio being greater than 1, microscopic (probably including some sub-microscopic) flaws, cracks, pores, channels, or the like are created in the capsule wall with no significant detrimental side effects, e.g. no noticeable increase in weak, imperfect, excessively frangible, or leaky capsules. At least some of the microscopic cracks, pores, etc. will completely traverse the capsule wall, either by a straightforward passage or a torturous route, and capsules with microporous walls are obtained. The existence of microporosity is confirmed by porosimeter studies, using an Aminco-Winslow mercury porosimeter, Model S-7107 or S-7108.

The presence of solute in the capsule walls can be demonstrated by analysis, using a scanning electron microscope having an x-ray detecting feature. One set of analyzed capsules originally contained an aqueous copper sulfate fill solution (25% by weight cupric sulfate-pentahydrate) and were used in a solute release rate test (3 days of leaching into water). The capsules were dried and cut in half. Copper was analyzed for, and detected at, four points in the capsule wall cross-section, ranging from the interior of the wall to its exterior, indicating an actual pass-through of cupric ion from the interior of the capsule toward the exterior.

Based on all the available evidence, one can envision a phase comprising amorphous resin molecules intimately associated with large polyolefin crystals, this polyolefin/amorphous resin phase surrounding a paraffin wax crystal. As the two crystalcontaining phases contract, a shearing action takes place between the two crystal types. When the second crystalline phase (i.e. the wax) is omitted, differential rates of contraction are still possible, but the aforementioned shearing action will probably be lost. Crystalline materials such as polyolefin exhibit a greater percent volume contraction than the amorphous materials. In the context of this invention, the present volume contraction of the polyolefin will ordinarily be at least 1.2 times greater, and preferably about 2 to 3 times greater than the amorphous resin contraction.

Thus, the capsule membrane (wall or shell) material of this invention, which provides the controlled release feature, is a multi-component blend, preferably a blend of resins and wax. The resin/wax mixture can be prepared so as to tailor the release rate of the encapsulated active ingredient to its desired application. A wide variety of adjustments in the release rate can be made by varying the composition of the capsule walls, both as to the physical properties of the selected ingredient and its weight fraction in the shell-forming melt. Since primarily physical rather than chemical phenomena are involved in the practice of this invention (in fact, chemical interaction between components is not preferred), capsule release rates can be controlled or adjusted by reference to easily calculated or observed criteria. Among these criteria are the volume contraction ratio (VCR, described previously) and the individual fractional volume contractions ($V_x$, etc.), the degree of compatibility of the various wall-forming components at various temperatures, the melting points (or melting ranges) of the individual capsule wall-forming components, eutechtic points and liquid-solid curves or tielines for component mixtures, the phase relationships (continuous, discontinuous, homogeneous, etc.) as between any plurality of components, and the like. Some of the phase relationships and the like are best determined empirically as well as by reference to known compatibility data, melting points, etc. In many instances, these properties can be determined without first making capsules. Needless to say, however, it is also useful to determine various gross properties of the capsules themselves, including their release rates, crush strength, membrane (i.e. wall or shell) porosity, size, etc. Materials used in this invention for the formation of capsule walls are preferably selected with a view toward providing durable crush-resistant, non-tacky capsules. Microscopic observation techniques have been devised for determining when a capsule bursts or leaks due to compressive forces. For example, two 25 × 75 mm microscope slides with capsules sandwiched between them can be carefully pressed together with the aid of suitable electric motor and clutch arrangement. This crush testing configuration can be calibrated to determine the pounds per square inch (psi) or kilograms per square centimeter force on capsules viewed through the microscope slides. Using this technique, capsule crush strengths in psi ranging from about 5 to about 20 psi have been observed.

As pointed out previously, the volume contraction ratio (VCR) for capsule wall-forming systems of this invention is preferably greater than 1.0, more preferably greater than 1.2. The VCR cannot be indefinitely increased, however. Excellent porosity of capsule walls has been obtained in practice with a VCR greater than 2.0, but the weight fraction of wax (Z) approaches a very high level as the VCR approaches 3.0. Generally speaking, between 2.0 and 3.0, the amount of wax must be increased to the point where the phase relationship can become inverted, and the wax can become the continuous phase upon cooling. In a typical polyethylene/amorphous hydrocarbon resin/wax blend, this inversion point can be reached at VCR values as low as 2.2. At these high VCR or high wax content levels, the wax becomes the continuous phase and the polyolefin/amorphous resin becomes the discontinuous phase upon cooling of the capsule walls. Relatively low porosity in the capsule walls appears to be a consequence of this phase inversion.

Once the various physical factors (compatibility, melting points, phase relationships, etc.) are properly specified, VCR values for a given range of systems can be made to correlate fairly well with porosity values and/or solute release rates. Anamolous results are likely to be observed, of course, when the capsule wall-forming system is: at a eutechtic point, so rich in wax as to produce the wax phase inversion described previously, capable of forming a plurality of dispersed phases, or incapable of forming a continuous matrix for a dispersed phase. These anamolous results may entail a decrease in capsule wall microporosity or some other poorly correlated or undesirable effect, but not necessarily a loss of the solute release feature of this invention.

The preferred components of the multi-component composition used to form the capsule walls of this invention will now be described.

CRYSTALLINE OLEFINIC POLYMERS

The crystalline polyolefins found useful in the capsule shells of this invention are those which have a specific gravity of about 0.90 to about 0.98, preferably about 0.91 to about 0.95, as determined by the density gradient technique (ASTM Test D 1505-63E). These polyolefins have been found to have molecular weights of about 1,000 to about 4,000, preferably about 1,500 to about 3,500, and exhibit an average viscosity of less than 500 cps at 140° C. (Brookfield viscometer, Model LVT). Polyolefins of higher specific gravity do not appear to be capable of producing as high a porosity in the capsule wall, while polyolefins of lower specific gravity are not sufficiently self-supporting to provide strong capsules. The preferred polyolefins are highly crystalline. The term "crystalline", as used herein, characterizes those olefin polymers which have a definite visible crystal structure as observed through a petrographic microscope. This crystallinity is at least partly responsible for the high fractional volume contraction ($V_x$) of these polymers, e.g. about 0.15 to about 0.25.

The term "polyolefin" or "olefin polymer" is intended to include homopolymers and those copolymers (including terpolymers, etc.) which have polyolefin character, particularly those which have some crystallinity. Generally speaking, copolymerization interferes with crystal structure; however, if at least about 50 weight percent of the polymer comprises repeating alkylene units (e.g., units derived from ethylene, propylene, 1-butene, or the like) where the polymer consists of at least 75 mole percent of such repeating alkylene units, some crystallinity will be retained, permitting the use of up to 25 mole percent of comonomers such as vinyl acetate, acrylic acid, acrylate ester, vinyl chloride, etc. Higher mole percentages of the monomers vinyl fluoride, vinyl alcohol, and carbon monoxide, are permissible in polyethylene copolymers.

The following is a list of typical commercially available ethylene polymers useful in the invention and their fractional volume contractions ($V_x$). All of these polymers are manufactured by Allied Chemical Plastics Division and have "AC" commercial grade numbers. Polymer grades AC 617, AC 7, and AC 8 are non-emulsifiable polyethylenes. Grades AC 656, AC 629, and AC 655 are emulsifiable polyethylenes. Grades AC 400, AC 401, and AC 405 are ethylene-vinyl acetate copolymers.

| Grade | Melt. pt. (° C.) | Density (g/cc) | $V_x$ |
|---|---|---|---|
| AC 617 | 102 | 0.91 | 0.180 |
| AC 7 | 107 | 0.92 | 0.227 |
| AC 8 | 116 | 0.93 | 0.223 |
| AC 656 | 96 | 0.92 | 0.193 |
| AC 629 | 101 | 0.93 | 0.180 |
| AC 655 | 104 | 0.93 | 0.197 |
| AC 400 | 95 | 0.92 | 0.165 |
| AC 401 | — | — | 0.183 |
| AC 405 | — | — | 0.180 |

AMORPHOUS THERMOPLASTIC RESINS

The amorphous organic resins utilized in the capsule shells of this invention can be one or more of a broad group of materials which are compatible at elevated temperatures at the desired ratio with the polyolefin. By "elevated temperatures" is meant the temperature of capsule manufacture which normally is at least above the melting point of the highest-melting component of the capsule wall-forming composition, preferably at least 100° C. above this highest melting point. The melting points or melting ranges of the preferred amorphous thermoplastic resins are normally in the range of about 50° to about 150° C., preferably between about 85° to about 115° C. It is preferred that the amorphous resins be selected to have a melting point or melting range near the melting point of the polyolefin. The preferred resins belong to a class of materials referred to in industry by the term "hydrocarbon resins". "Hydrocarbon resins" are defined by the Kirk-Othmer *Encyclopedia of Chemical Technology*, Second Edition, Volume 11, John Wiley & Sons, New York, New York, 1966, page 242 et seq., as the readily thermoplastic polymers of low molecular weight derived from coal-tar fractions, from deeply cracked petroleum distillates, and from turpentine. These "hydrocarbon resins" (which are not hydrocarbon in the strictest sense of the term, since they may contain minor amounts of oxygen or other elements occurring in these natural materials) generally have a molecular weight of about 800 to about 4,000, preferably about 1,000 to about 2,000. Typical hydrocarbon resins (as defined by Kirk-Othmer) useful in the practice of this invention include coumarone-indene resins, indene resins, natural and synthetic terpene-based resins, alkyl-aromatic thermoplastic hydrocarbon resins, vinyl arene resins (based on polymers and copolymers of vinyl toluene, styrene, vinyl naphthalene, etc.), wood resins, asphaltic resins, and other resins described by Kirk-Othmer. Natural and synthetic polyterpene is particularly useful and is commercially available as "Wing-Tack 95" (Goodyear Tire and Rubber Co.), and the various "Piccolyte" resins available from Pennsylvania Industrial Chemical Corporation. From the standpoint of obtaining high compatibility with polyolefins and high porosity in capsule walls, the Piccopale resins (Pennsylvania Industrial Chemical Corporation) have been found to be particularly suitable. The Piccopale resins are produced by high temperature cracking of petroleum, which produces a mixture of monomers averaging about 90 in molecular weight, including dienes and reactive olefins. Polymerization of this olefinic material produces resins with substantially straight-chain hydrocarbon backbones and some cyclic content, but little or no aromatic content.

The amount of hydrocarbon resin and crystalline polyolefins in the capsule wall-forming material are variable but to some extent interrelated. To avoid an excessive contraction rate in the polyolefin/amorphous resin phase, the polyolefin content should not exceed about 95% by weight of the capsule shell or wall composition. The amount of hydrocarbon resin is preferably at least about 5% by weight of the total composition for the same reason. It is permissible to lower the polyolefin content to about 15 or 20% by weight, provided that the previously described phase relationships can be properly maintained. These phase relations are most easily obtained when the ratio of polyolefin to amorphous resin is at least 1:1. The amount of wax which can be added is somewhat limited, as will be explained subsequently. It is therefore generally true that drastically decreasing the polyolefin content may require increasing the hydrocarbon resin content and losing some of the diversity in crystal structure between at least two predominantly crystalline phases.

These hydrocarbon resins used in this invention exhibit a fractional volume contraction ($V_y$) which is less than the $V_x$ and is preferably in the 0.10 – 0.15 range.

The preferred amount of amorphous hydrocarbon resin ranges from about 5 to about 45% by weight of the total capsule wall-forming composition.

Other commercially available amorphous thermoplastic hydrocarbon resins include the following materials available from Pennsylvania Industrial Chemical Corporation: "Piccoumaron" resins (polyindine type), "Piccovar" resins (alkyl-aromatic type), "Piccotex" resins (vinyl toluene copolymers), and "Piccolastic" resins (low molecular weight polystyrene type). The fractional volume contraction ($V_y$) of the aforementioned "Wing-Tack 95" is 0.102.

The fractional volume contractions ($V_y$) of the aforementioned Piccopale and Piccolyte resins vary slightly depending on the melting points or ranges of the resins. The density of all the common available grades (Piccopales 70 SF, 85 SF, and 100 SF melting at about 70°, 85°, and 100° C., respectively, and Piccolytes S-40, S-85, S-100, and S-135, melting at about 40°, 85°, 100°, and 135° C., respectively) is in the range of 0.96 – 0.98 gram per cubic cm (g/cc) and the $V_y$ values are as follows:

| "Piccopale" | "Piccolyte" | $V_y$ |
|---|---|---|
| 70 SF | — | 0.1133 |
| 85 SF | — | 0.1200 |
| 100 SF | — | 0.1333 |
| — | S-40 | about 0.13 |
| — | S-85 | 0.120 |
| — | S-100 | 0.1333 |

-continued

| "Piccopale" | "Piccolyte" | $V_u$ |
|---|---|---|
| — | S-135 | about 0.12 |

THE WAX COMPONENT

The third component of the preferred composition comprises a wax or mixture of waxes, including the natural and/or petroleum and/or synthetic waxes. Again, the wax should be compatible with the other two components at the capsule manufacturing temperature, which temperature will normally be higher than the melting point of the highest-melting component of the mixture used to form the capsule wall. Crystalline paraffinic or other highly crystalline waxes are preferred, the microcrystalline petroleum waxes, the animal and vegetable waxes, the synthetic ester or amide-type waxes, etc. being less preferred. The weight fraction of wax in the capsule wall-forming composition preferably ranges from about 2 to about 25 weight percent. Generally speaking, increasing amounts of wax produce increasing porosity, up to the phase inversion condition described previously. Accordingly, the upper limit of wax concentration is not numerically fixed, but may vary to some degree with the system selected. Stated another way, the quantity of wax should be selected such that the volume contraction ratio (VCR) is at least about 1.2, but preferably not significantly greater than about 2.5. Capsule wall porosities (determined by mercury porisimetry) of at least 3% can be obtained when the wax content is at least 10% by weight.

Typical preferred waxes have a density ranging from about 0.9 to about 1.05, melting points ranging from about 50° to about 90° C., molecular weights ranging from about 300 to about 1500, preferably about 400 to about 800, and fractional volume contractions ($V_z$) of at least about 20%. The wax component thus has a rate or extent of contraction slightly greater than the preferred polyolefins, and considerably greater than the amorphous thermoplastic resins; hence the wax contraction can be significantly greater than the contraction of a polyolefin/amorphous resin phase.

Data on suitable commercial paraffin grade waxes ("Shellwax" 100, 200, 300, and 700, available from Shell Chemical Company) are set forth below:

| Grade ("Shellwax") | Melting Pt. (° C.) | Density | $V_z$ |
|---|---|---|---|
| 100 | 51.4 | 0.91 | 0.260 |
| 200 | 60.8 | 0.92 | 0.257 |
| 300 | 70.6 | 0.93 | 0.250 |
| 700 | 83.9 | 0.94 | 0.242 |

| Wax Grade Mixtures Wt % 100 / Wt % 700 | $V_z$ |
|---|---|
| 10/90 | 0.237 |
| 20/80 | 0.240 |
| 50/50 | 0.243 |
| 80/20 | 0.250 |

Among the suitable microcrystalline grades are Shellmax 400 (m.p. 80.6° C., density 0.94 g/cc, $V_z$: 0.223) and 500 (m.p. 60.6° C., density 0.93 g/cc, $V_z$: 0.200).
Other suitable wax grades are:

| Grade | m.p. (° C.) | Density (g/cc) | $V_z$ |
|---|---|---|---|
| Carnauba | 82.5 – 86.1 | 0.996 – 0.998 | 0.228 |
| Ouricury | 82.5 – 84.4 | 0.97 – 1.050 | 0.2133 |
| Montan | 83.0 – 89.0 | 1.020 – 1.030 | 0.200 |

OTHER ADDITIVES

It is within the scope of this invention to add high boiling solvents and/or plasticizers to the capsule wall-forming composition. The plasticizer or flexibilizer materials lower the melt viscosity of a capsule wall-forming composition and increase capsule flexibility, thus resistance to breakage. Among the suitable plasticizers are: mineral oil, soya oil, peanut oil, and safflower oil. Anti-oxidants include octadecyl 3-(3',5'-di-t-butyl-4'-hydroxyphenyl) propionate and other compounds containing stearically hindered phenolic hydroxyls.

Typical water-soluble liquid agricultural chemicals which may be encapsulated for release of the active ingredient are aqueous solutions of urea; ammonium phosphates, sulfates, or nitrates; salts of 2–4, dichlorophenoxy acetic acid, trichloroacetic acid, trichlorobenzoic acid, or dichloropropionic acid; copper salts; potassium salts; salts of 3,6-endoexohexahydrophthalate, disodium and potassium salts being especially preferred; and salts of 1:1'-ethylene 2:2 dipyridylium, the dibromide being especially preferred. Suitable emulsifiable chemicals include the organo-phosphorous compounds disclosed in U.S. Pat. Nos. 3,317,636 and 2,578,652. Solutes or emulsoids which have the ability to chemically or physically attack the capsule walls should be avoided. But virtually any solute, emulsoid or dispersoid which does not have this undesirable property can be used in solution or emulsion form as a fill material for capsules of this invention. Thus, the fill material can be a solution, emulsion, or dispersion comprising fertilizers or pesticides (i.e. economic poisons), such as algicides, herbicides, and plant growth regulators.

In general, the capsules are formed and filled by forcing a jet of fill liquid through a body of molten capsule shell material, the jet being directed to follow a desired trajectory which causes a concentric shell to form around the liquid fill material. Cooling the molten capsule shell causes it to solidify and form capsules containing liquid fill solution, the capsules being non-tacky and dry on their exterior. See U.S. Pat. No. 3,423,489 (Arens et al), issued January 21, 1969. Other suitable methods of capsule formation are described in the Arens et al patent and in U.S. Pat. Nos. 2,799,897, 2,911,672, and 3,015,128.

The ability of the capsules to release the contained solute over a period of time is readily demonstrated by extraction techniques. Twenty grams of filled capsules are placed in a sealed bottle together with 100 ml of distilled water and allowed to stand for 24 hours at 25° C. A 10 ml aliquot is thereafter withdrawn, evaporated to dryness, the amount of solid residue determined, and the percent of active ingredient released during the 24 hour period calculated. The remaining solution is decanted and 100 ml of fresh distilled water added, the bottle resealed and allowed to stand for a second 24 hour interval, another aliquot removed, and the percent of active ingredient released is calculated. The procedure is then repeated at various intervals.

The following non-limiting Examples, in which all parts are by weight unless otherwise indicated, illustrate preparation of the capsules of this invention.

DESCRIPTION OF PREFERRED EMBODIMENTS

EXAMPLE I

An apparatus as illustrated in FIG. 1 of U.S. Pat. No. 3,423,489 was used to form capsules filled with an aqueous fertilizer solution. The apparatus contained a submerged, generally upwardly pointed nozzle for discharging fill liquid to be encapsulated. The nozzle was supplied by a conduit means provided with a needle valve to control the flow, and was immersed beneath the surface of a bath of hardenable liquid encapsulating material. The level of the liquid encapsulating material was maintained at an even distance above the nozzle orifice by means of a constant level overflow reservoir provided with a recirculating pump. Air pressure was applied to the reservoir of fill liquid and the nozzle was provided with tip windings of an electrical resistor to minimize congealing of encapsulating material around the nozzle.

The capsule shell comprised 85 parts polyolefin and 15 parts compatible hydrocarbon resin. The nozzle was inclined at an angle of 30° from the vertical, was provided with an orifice of 0.74 mm in diameter, and was immersed in the bath to a depth of 2 mm. The full liquid had the following composition:

| | Parts |
|---|---|
| Water | 34.0 |
| Urea | 27.6 |
| 11-37-0 analysis fertilizer (TVA liquid base solution) | 12.0 |
| 10% solution of an interpolymer of methyl vinyl ether and maleic anhydride ("Gantrez" AN-169, General Analine and Film Corporation) | 25.3 |
| 25% solution of the sodium salt of alkyl aryl polyether sulfonate ("Triton" X-200, Rohm and Haas Company) | 1.1 |

The shell composition was as follows:

| | |
|---|---|
| Polyolefin, 1,500 molecular weight, 102° C. softening point, 0.91 specific gravity, 145 cps viscosity at 140° C. (Polyethylene AC617A, Allied Chemical Co.) | 85.0 |
| Hydrocarbon resin, 95° C. softening point, 0.93 specific gravity ("Wing-Tack" 95, Goodyear Tire and Rubber Company). | 15.0 |

Four liters of filtered fill solution were placed in the reservoir to which 0.34 atmospheres gauge pressure was applied. The temperature of the fill liquid was 22° C. The shell composition temperature was 250° C., and the tip winding was heated to about 700° C. The needle valve was opened and the fill solution was discharged at a rate of 133 cm per minute. The polyolefin-hydrocarbon shell composition solidified at a distance approximately 100 cm from the orifice, this time being sufficient to permit the biliquid column to form a string of capsules and then to separate into individual discrete capsules. Capsules were produced at the rate of about 40,000 per minute. The total trajectory length was about 10 feet after which the capsules were allowed to fall into water filled collecting trough. The capsules collected were 2125 microns in average diameter and had a shell wall thickness of about 120 microns. The fill liquid comprised about 79% of the total capsule weight and the shell material about 21%. The release properties of these capsules were demonstrated by extraction as previously described, the results being shown in TABLE I.

EXAMPLE II

This Example illustrates encapsulation of liquid fertilizer solution in a capsule shell comprising 70 parts of the polyolefin used in Example I and 30 parts of the hydrocarbon resin of Example I. The temperature of the fill solution was 20° C., and the shell composition temperature was 230° C. The fill solution and capsule mixture were discharged at a rate of 149.5 cc/min. Capsules were produced at the rate of about 40,000 per minute. The capsules collected were 2360 microns in average diameter and had a shell wall thickness of about 140 microns. The fill liquid comprised about 75% of the total capsule weight and the shell material about 25%. These capsules were extracted as previously described, the results being shown in TABLE I.

EXAMPLE III

This Example illustrates encapsulation of liquid fertilizer solution in a capsule shell comprising 60 parts of the polyolefin used in Example I and 40 parts of the hydrocarbon resin of Example I. The nozzle angle and trajectory length were substantially the same as utilized in Example I. The temperature of the fill liquid was 22° C. and the temperature of the shell composition was 240° C. Capsules were produced at the rate of about 40,000 per minute. The capsules collected were 2360 microns in average diameter and had a shell wall thickness of about 140 microns. The fill liquid comprised about 75.6% of the total capsule weight and the shell material about 24.4%. These capsules were extracted to demonstrate fertilizer release, the results being shown in TABLE I.

EXAMPLE IV

This Example illustrates the encapsulation of liquid fertilizer in a capsule shell comprising 60 parts of the polyolefin of Example I, 37.5 parts of the hydrocarbon resin of Example I, and 2.5 parts of hydrocarbon wax having a melting point of 84° C., and a specific gravity of 0.94 at 15° C. (Shellwax 700, Shell Chemical Company).

Four liters of filtered fill solution were placed in the reservoir to which 0.34 atmospheres gauge pressure was applied. The temperature of the fill liquid was 20° C. The temperature of the shell composition was 241° C. and the temperature of the tip winding was about 700° C. The needle valve was opened and the full solution was discharged at a rate of 149.5 cm/min. Capsules were produced at the rate of about 40,000 per minute. The capsules collected were about 2360 microns in average diameter and had a shell thickness of about 140 microns. The fill liquid comprised about 75.6% of the total capsule weight and the shell material about 24.4%. These capsules were extracted as previously described, the results being shown in TABLE I.

EXAMPLE V

This Example illustrates encapsulation of liquid fertilizer in a shell comprising the components used in Example IV, except that the ratio was 60 parts polyolefin, 35 parts hydrocarbon resin, and 5 parts wax. The machine operating conditions were the same as those used in Example IV. The capsules collected were 2360 microns in average diameter and had a shell thickness of about 140 microns. The fill liquid comprised about 75.6% of the total capsule weight and the shell material about 24.4%. These capsules were extracted as previously described, the results being illustrated in TABLE I.

EXAMPLE IV

This Example illustrates encapsulation of liquid fertilizer in a shell comprising the components used in Example IV, the ratio of components being 60 parts polyolefin, 30 parts hydrocarbon resin, and 10 parts wax. Machine operating conditions were the same as those utilized in Example IV. Capsules were produced at the rate of about 40,000 per minute. The capsules collected were 2360 microns in average diameter and had a shell thickness of about 140 microns. The fill liquid comprised about 75.6% of the total capsule weight and the shell material about 24.4%. These capsules were extracted as previously described, the results being shown in TABLE I.

EXAMPLE VII

This Example illustrates encapsulation of a liquid herbicide in a capsule of the invention and illustrates incorporation of a mineral oil plasticizer in the capsule shell. The nozzle was inclined at an angle of about 30° from the vertical, was provided with an orifice 0.74 mm in diameter, and was immersed in the bath to a depth of about 2 mm. The fill liquid was 61.5 parts of a 65% aqueous solution of 1:1' -ethylene '2:2' dipyridylium dibromide ("Diquat", Chevron Chemical Company), 20.6 parts water, and 25.3 parts of a 10% aqueous solution of an interpolymer of methyl vinyl ether and maleic anhydride ("Gantrez" AN-169, General Aniline and Film Corporation).

The shell composition was 59.8 parts of the polyolefin used in Example IV, 21.4 parts of the hydrocarbon resin used in Example IV, 14.5 parts of the hydrocarbon wax used in Example IV, and 4.3 parts mineral oil ("Mujol" liquid petrolatum).

Four liters of filtered fill solution were placed in the reservoir to which 0.27 atmospheres gauge pressure was applied. The temperature of the fill liquid was 22° C. The shell composition temperature was 284° C., and the temperature of the tip winding was about 700° C. The needle valve was opened and the fill solution was discharged at a rate of 106 cc/min. The capsule solidified at a distance of approximately 120 cm from the orifice which was one second travel time of the capsule in the trajectory path. This time was sufficient to permit the biliquid column to first form a string of capsules and then to separate into individual discrete capsules. Capsules were produced at the rate of about 35,000 per minute. The total trajectory length was about 8 feet after which the capsules were allowed to fall into a water filled collecting trough. The capsules collected were 2360 microns in average diameter and had a shell thickness of about 82 microns. The fill liquid comprised about 81.3% of the total capsule weight and the shell material about 18.7%.

The results indicated in TABLE I show that the capsules of this example released less than 5% of their contents during the first 24 hours and released less than 10% of the contents in five days. This was considered to be a release rate sufficient to provide an adequate initial dosage of herbicide to the plants and also allow steady release of more herbicide for a definite period of time.

EXAMPLE VIII

This Example illustrates the practical utility of these capsules for use with live tomato plants. An 18-4-4 fertilizer comprising 40.5 parts urea, 5.95 parts $NH_4H_2PO_4$, 5.8 parts KCl, 47.25 parts water, and 0.5 part surfactant ("Pluronic" L-64) was encapsulated and applied to plants. This fertilizer was encapsulated in the manner utilized in Example I, the capsule shell composition being 59.8 parts of the polyethylene used in Example I, 21.4 parts of the hydrocarbon resin used in Example I, 14.5 parts of the hydrocarbon wax used in Example I, and 4.3 parts non-hydrogenated peanut oil. The shell material comprised 35% of the total weight of the capsule and the fill solution was correspondingly 65%.

Six 6-inch flower pots were filled with vermiculite, another six 6-inch flower pots filled with a low nutrient content soil, and a healthy started tomato plant transferred to each pot. The above fertilizer filled capsules were uniformly incorporated in two pots of vermiculite and in two pots of soil at the rate 1½ tablespoons per pot (i.e., about 2 lbs. of nitrogen per cubic yard of planting media). One and one-half tablespoons of capsules was also added by top dressing to each of the two other pots of vermiculite and to two pots of soil. Two pots of vermiculite and two pots of soil were left as controls without any fertilizer. The plants were all watered with ½ to 1 liter of water per day, the progress of plant growth being noted at two week intervals.

Those tomato plants having fertilizer-filled capsules either incorporated in the pot contents or top dressed thereon showed normal growth, bore fruit, and showed no nutrient deficiencies until after 3½ months. Those plants in pots not containing any encapsulated fertilizer showed nutrient deficiencies after 4 weeks and did not bear fruit.

TABLE I

| Example | Cumulative Total Percent of Fill Solution Extracted at Various Intervals | | | | | | | | | |
|---|---|---|---|---|---|---|---|---|---|---|
| | 1 Day | 2 Days | 3 Days | 4 Days | 5 Days | 6 Days | 7 Days | 8 Days | 9 Days | 10 Days |
| 1 | 9.36 | 11.74 | 12.36 | 13.08 | — | — | 14.53 | 15.01 | 15.53 | 15.90 |
| 2 | 3.76 | 5.51 | 5.73 | 6.09 | — | — | 7.42 | 7.87 | 8.40 | 8.84 |
| 3 | 5.13 | 5.5 | 5.81 | 5.96 | — | — | — | — | — | — |
| 4 | 1.37 | 1.68 | 1.79 | 1.90 | — | — | — | — | — | — |
| 5 | 7.76 | 9.30 | 10.07 | 10.61 | — | — | — | — | — | — |
| 6 | 9.81 | 11.52 | 12.35 | 12.86 | — | — | — | — | — | — |
| 7 | 1.69 | 2.75 | 4.04 | — | — | 10.27 | 13.79 | 17.73 | 21.78 | 26.18 |

TABLE I-continued

| | Cumulative Total Percent of Fill Solution Extracted at Various Intervals | | | | | | | | | |
|---|---|---|---|---|---|---|---|---|---|---|
| Example | 1 Day | 2 Days | 3 Days | 4 Days | 5 Days | 6 Days | 7 Days | 8 Days | 9 Days | 10 Days |
| 8 | 7.95 | 11.05 | 12.92 | 14.24 | — | — | 16.61 | 17.49 | 18.24 | — |

EXAMPLES IX – XX

The method of manufacture of these capsules was substantially as in Example I. All capsules had a polyolefin component (polyethylene "AC 617"), a hydrocarbon resin component (Wing Tack 95 described in Example I), and a wax component (Shellwax 700, described in Example IV). Two parts mineral oil were added in Examples XI and XV. The compositions, mercury porosimeter determinations, and the calculated volume contraction ration (VCR) values of Examples IX – XX are set forth below in TABLE II. The fractional contraction values for the individual components have been given previously. The average daily percent of solute extracted by the standardized water leach test described previously stabilized after the first three days of leaching and was found to be substantially constant for all these Examples, indicating a uniform shell wall porosity as opposed to random gross flows in capsule walls. Further evidence of capsule wall integrity was provided by crush strength data (which also is maximized by the regularity of the capsule shape and the physical strength of the capsule walls). In the crush strength test described in the body of this specification, capsule failure was considered to occur when the tested capsule was observed to leak fluid or burst. The crush strength measurements in all of these Examples were in the range of 11 – 18 psi. A stain test (described subsequently) indicated that the capsules of Examples IX – XX contained no gross flaws. In the leach test column of Table II, a "low" rate indicates less than 1.0 wt. % of active ingredient per day; "moderate" indicates less than 2.0%/day, and "high" indicates greater than 2.0%/day. The active ingredient was copper (II) sulfate pentahydrate, the composition of the fill being:

25.6% cupric sulfate-pentahydrate
72.43% water
1.97% thickener and surfactant

Table II

| Composition* (parts by wt.) | | | | Porosity | | Leach |
|---|---|---|---|---|---|---|
| Ex. | X | Y | Z | MO | (Vol. %) | VCR | Rate |
| 9 | 45 | 45 | 10 | 0 | 3.67 | 1.186 | low |
| 10 | 45 | 40 | 15 | 0 | 10.96 | 1.264 | low |
| 11 | 45 | 40 | 15 | 2 | 11.87 | 1.26 | low |
| 12 | 45 | 30 | 20 | 0 | 12.07 | 1.404 | high |
| 13 | 40 | 35 | 25 | 0 | 9.71 | 1.548 | high |
| 14 | 40 | 35 | 25 | 0 | 23.11 | 1.548 | high |
| 15 | 40 | 35 | 25 | 2 | 17.83 | 1.54 | high |
| 16 | 50 | 15 | 35 | 0 | 24.03 | 1.781 | high |
| 17 | 20 | 40 | 40 | 0 | 5.23 | 2.233 | ** |
| 18 | 44 | 40 | 16 | 0 | 14.40 | 1.315 | moderate |
| 19 | 43 | 40 | 17 | 0 | 19.13 | 1.339 | moderate |
| 20 | 42 | 40 | 18 | 0 | 15.44 | 1.365 | moderate |

*X is the polyolefin; Y is the hydrocarbon resin; Z is the paraffin wax; MO is mineral oil.
**High release rate due to capsule shell wall failure in water. Wax formed continuous phase.

The aforementioned stain test procedure is described below:

A. A small sized strainer was filled with capsules to a depth of ¼ inch.

B. The strainer was submerged in a reservoir filled with ink (stamp pad ink — solution type, not pigmented type).

C. The capsules were allowed to remain in submerged for one minute.

D. The strainer was removed from the ink reservoir and allowed to drain.

E. The capsules were then rinsed with tap water so as to remove all surface ink.

F. The thus rinsed capsules were placed on paper and allowed to dry.

G. Stained flaws or darkened capsules were noted.

No darkened capsules (indicating gross flaws) were noted in any of the preceding Examples. The only stains noted were pinholes, indicating large pores, in the walls of the capsules of Examples XII, XVII, XIX, and XX.

EXAMPLES XXI – XXV

The manufacture of these capsules was as in Examples IX – XX. All capsules had a polyethylene "AC 617" (X) component, a hydrocarbon resin (Y) component, and a wax (Z) component. The amounts used in each of these Examples were as follows:

| | | Parts by Weight |
|---|---|---|
| X: | Polyethylene | 45 |
| Y: | Hydrocarbon resin | 40 |
| Z: | Wax | 15 |

The data for Examples XXI – XXV are given in Table III.

TABLE III

| EX. | Hydrocarbon Resin | Wax | Porosity (vol. %) | VCR | Leach Rate |
|---|---|---|---|---|---|
| 21 | S-100[1] | SW700[4] | 12.14 | 1.269 | low |
| 22 | 100SF[2] | SW700[4] | 11.57 | 1.269 | moderate |
| 23 | S-85[1] | SW700[4] | 36.98 | 1.279 | low |
| 24 | WT-95[3] | SM500[5] | 20.71 | 1.243 | low |
| 25 | 85SF[2] | SW700[4] | 16.59 | 1.279 | high |

[1]"Piccolytes": polyterpenes described previously
[2]"Piccopales": synthetic polymerized petroleum hydrocarbons, described previously
[3]"Wing-Tack 95": described previously
[4]"Shellwax" 700: described previously
[5]"Shellmax" 500: described previously Examples 21, 23, and 24 showed no staining whatever in the stain test. The other Examples exhibited tiny pinholes. The capsule walls in Examples 23 and 24 appeared to form three incompatible or distinct solid phases upon cooling. The mercury porosimeter values for these two Examples probably indicate high surface roughness, hence, the low leach rates, which otherwise correlate well with the VCR values. Examples 22 and 25 indicate the high pore-forming ability of the Piccopale - containing systems. Crush strength was good for Examples 21 and 22, lower (8.5 – 11 psi) for Examples 23 – 25.

EXAMPLE XXVI

Capsules were made according to Example X, except that the fill material was the following oil-in-water type emulsion:

|  | Parts by wt. |
|---|---|
| "Abate 4E" (Cyanamid, mosquito larvicide of U.S. Patent 3,317,636) | 3.34 |
| Water | 58.13 |
| Sucrose | 28.43 |
| 20,000 MW polyethylene glycol | 9.16 |
| Emulsifiers | 0.93 |

In actual field trials on field areas of at least 0.1 acre, the capsules were found to provide controlled release of the active larvicide, prolonging the usefulness of the active chemical at least by a factor of 8.

As the preceding Examples indicate, the capsules of this invention provide controlled release of a variety of dissolved or suspended substances. The solvent or other encapsulated liquid can also be controllably released by a transport and evaporation mechanism if the liquid is volatile at the temperature of use. For example, encapsulated water can be used to provide a high humidity environment. Reverse pass-through of solutes or the like is also possible, permitting water-filled capsules to be used to stabilize the concentration of a solute in a given system.

As shown by the aforementioned Arens et al. U.S. Pat. No. (3,423,489), both polar and non-polar, relatively high surface tension liquids, which boil at temperatures above 60° C., e.g. imidazole, alkylene glycols, carboxylic acids, higher alkanes, etc. can be encapsulated in molten organic materials by the biliquid column technique, and hence can be used as fill materials in this invention.

What is claimed is:

1. A capsule comprising a liquid fill and a microporous capsule wall, said microporous capsule wall comprising a dispersed solid phase comprising a first material and a continuous solid phase comprising a second material, said first and second materials being miscible and capable of forming a single phase when both of said materials are in a liquid state, but being capable of forming separate phases upon being cooled to a solid state, the volume contraction ratio being at least about 1.2, said first material being present in a quantiy sufficient to provide micropores which extend completely through said capsule wall, said liquid fill comprising an active ingredient selected from the group consisting of pesticides and fertilizers.

2. A capsule according to claim 1 wherein said liquid fill comprises a pesticide selected from the group consisting of algicides and herbicides.

3. Capsules according to claim 1 wherein said first material is a crystalline material.

4. Capsules according to claim 1 wherein said micropores comprise at least 3 volume percent of said capsule wall.

5. A capsule according to claim 1 wherein said first material is a crystalline material and said second material is an amorphous material.

6. A capsule according to claim 1 wherein said microporous capsule wall is substantially spherical and is free of gross flaws.

7. A capsule according to claim 1 wherein said composition of the microporous capsule wall comprises at least 2% by weight of a wax and at least 5% by weight of a hydrocarbon resin, substantially the remainder of said composition being a crystalline olefinic polymer.

8. A substantially spherical capsule comprising a liquid fill and a microporous capsule wall, said microporous capsule wall comprising a plurality of phases including (1) a solid, crystalline olefinic polymer phase, (2) an amorphous phase comprising a hydrocarbon resin, and (3) an at least partially crystalline wax phase, said phases being miscible and capable of being blended to form a single phase at least when all of said phases are in a molten state; said phase (3) being capable of separating out as a discontinuous mass dispersed throughout a continuous matrix comprising at least one of said phases (1) and (2), thereby assisting in the creation of micropores extending completely through said capsule wall upon cooling of said plurality of phases to a solid state, said liquid fill comprising an active ingredient selected from the group consisting of pesticides and fertilizers.

9. A capsule according to claim 8 wherein said liquid fill comprises a pesticide selected from the group consisting of algicides and herbicides.

10. A capsule according to claim 8 wherein said continuous matrix comprises a substantially homogeneous, combined phase comprising said olefinic polymer phase and said hydrocarbon resin.

11. A capsule according to claim 8 wherein the composition of said microporous capsule wall comprises:
at least 2% by weight of said wax phase, and
at least 5% by weight of said hydrocarbon resin, substantially the remainder of the composition of said capsule wall being a solid, crystalline olefinic polymer intimately blended with said hydrocarbon resin.

12. A capsule according to claim 11 wherein said capsule wall further comprises a minor amount of a plasticizer and a minor amount of an anti-oxidant.

13. A capsule according to claim 8 wherein the amounts of the olefinic polymer of said olefinic polymer phase, said hydrocarbon resin, and the wax of said wax phase are selected such that the expression $$\frac{XV_x + YV_y + ZV_z}{XV_x + YV_y}$$

will be greater than 1 but less than about 3, where
X is the weight fraction of said olefinic polymer,
Y is the weight fraction of said hydrocarbon resin,
Z is the weight fraction of said wax,
$V_x$ is the fractional volume contraction of a measured volume of said olefinic polymer upon cooling from 230° C. to 25° C.,
$V_y$ is the fractional volume contraction of said hydrocarbon resin, determined in the same manner as $V_x$, and
$V_z$ is the fractional volume contraction of said wax determined in the same manner as $V_x$.

14. A capsule according to claim 8 wherein said phase (1) comprises homopolymeric polyethylene and said phase (2) comprises a hydrocarbon resin.

* * * * *